(12) United States Patent
Lee et al.

(10) Patent No.: US 7,388,712 B2
(45) Date of Patent: Jun. 17, 2008

(54) CONFOCAL SCANNING MICROSCOPE USING TWO NIPKOW DISKS

(75) Inventors: Suk-Won Lee, Suwon-si (KR);
Kwang-Soo Kim, Suwon-si (KR);
Dae-Gab Gweon, Daejeon (KR);
Dong-Kyun Kang, Daejeon (KR);
Hong-Ki Yoo, Bucheon (KR);
Seung-Woo Lee, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 11/106,569

(22) Filed: Apr. 15, 2005

(65) Prior Publication Data

US 2006/0061857 A1   Mar. 23, 2006

(30) Foreign Application Priority Data

Sep. 22, 2004   (KR) .................. 10-2004-0075996

(51) Int. Cl.
*G02B 21/00* (2006.01)
*G02B 26/10* (2006.01)

(52) U.S. Cl. .................. 359/368; 359/233; 359/235
(58) Field of Classification Search ......... 359/232–236, 359/368
See application file for complete search history.

(56) References Cited

U.S. PATENT DOCUMENTS

| 2,989,891 | A | * | 6/1961 | Rockafellow | 356/394 |
| 3,072,740 | A | * | 1/1963 | Astheimer | 348/201 |
| 3,518,014 | A | * | 6/1970 | Weber | 356/629 |
| 3,671,754 | A | * | 6/1972 | Mundkur | 250/236 |
| 4,927,254 | A | * | 5/1990 | Kino et al. | 359/235 |
| 5,067,805 | A | | 11/1991 | Corle et al. | |
| 5,351,150 | A | * | 9/1994 | Lichtman et al. | 359/232 |
| 5,737,121 | A | | 4/1998 | Dixon | |
| 5,760,950 | A | * | 6/1998 | Maly et al. | 359/368 |
| 5,825,533 | A | | 10/1998 | Yonezawa | |
| 5,835,228 | A | * | 11/1998 | Okazaki et al. | 356/432 |
| 6,179,421 | B1 | * | 1/2001 | Pang | 351/205 |
| 6,934,079 | B2 | * | 8/2005 | Hell et al. | 359/368 |

FOREIGN PATENT DOCUMENTS

| JP | 08-338948 | 12/1996 |
| JP | 09-127425 | 5/1997 |
| JP | 2003-344775 | 12/2003 |
| KR | 2001-34046 | 4/2001 |
| KR | 2003-80039 | 10/2003 |
| WO | WO 9935527 A1 * | 7/1999 |
| WO | WO 02/067570 A1 * | 8/2002 |

* cited by examiner

*Primary Examiner*—Alessandro Amari
*Assistant Examiner*—Mark Consilvio
(74) *Attorney, Agent, or Firm*—Stanzione & Kim, LLP (57) ABSTRACT

A confocal scanning microscope using a Nipkow disk prevents deterioration of performance in an optical axis direction while maintaining a high measurement speed. The confocal scanning microscope includes a light source, an illuminating device to pass the light from the light source toward a certain direction, and two Nipkow disks each having slit-shaped apertures formed thereon such that the light incident from the illuminating device travels in a form of light which passed through a single aperture. In addition, the confocal scanning microscope includes a first optical system to form an image on a sample by the light passed through the Nipkow disks, and a second optical system to form a second image by the light reflected from the sample and passed through the Nipkow disks.

19 Claims, 11 Drawing Sheets

CONFOCAL SCANNING MICROSCOPE USING TWO NIPKOW DISKS

CROSS-REFERENCE TO RELATED APPLICATIONS

This application claims the benefit of Korean Patent Application No. 2004-75996, filed on Sep. 22, 2004 in the Korean Intellectual Property Office, the disclosure of which is incorporated herein by reference.

BACKGROUND OF THE INVENTION

1. Field of the Invention

The present general inventive concept relates to a confocal scanning microscope to measure critical dimensions of a semiconductor device and an image output device to perform a real time check in a production process of the semiconductor device and image output devices.

2. Description of the Related Art

Confocal microscopes are apparatuses for irradiating a sample with light having a certain wavelength, controlling the light to be reflected from the sample through a confocal aperture, such as a pin hole, and detecting the light only emitted from a focal plane of an objective lens using a photodetector (PD), the principle of which is disclosed in Korean Patent Laid-Open No. 2002-0084786.

As disclosed in the above mentioned reference, since light reflected from a portion outside the focal plane of the objective lens of the confocal microscope does not pass through the pin hole, and hence, is not detected in the photo-detector, the confocal microscope has not only a high resolution in an optical axis direction but also a resolution higher than that of existing optical microscopes in an direction perpendicular to the optical axis direction. In addition, with the confocal microscope disclosed in the above reference, it is possible to observe a desired plane on the sample and obtain a three-dimensional image of the sample.

Owing to the high resolution and the capability of obtaining the three-dimensional image, confocal microscopes has been widely used in the fields of cell biology and semiconductor chip testing.

As one of methods for obtaining a two-dimensional plane image using such a confocal microscope, Japanese Patent Laid-Open No. Hei 06-018786 discloses a confocal microscope for scanning every point of a measurement area with light using point scanning of a television scan line system. The confocal microscope employs a method of deflecting light in two perpendicular axis directions using two optical deflectors, and scanning each point of the measurement area with the deflected light. However, such a confocal microscope has a problem in that it takes a long time to obtain the two-dimensional image due to a limited mechanical speed of the optical deflectors and a calculation load of serial signal processing.

As a method for obtaining higher image acquisition speed, compared to the method using the optical deflectors, U.S. Pat. No. 5,067,805 discloses a confocal scanning microscope using a Nipkow disk, the principle of which will be described with reference to FIG. 1.

Figure 1:
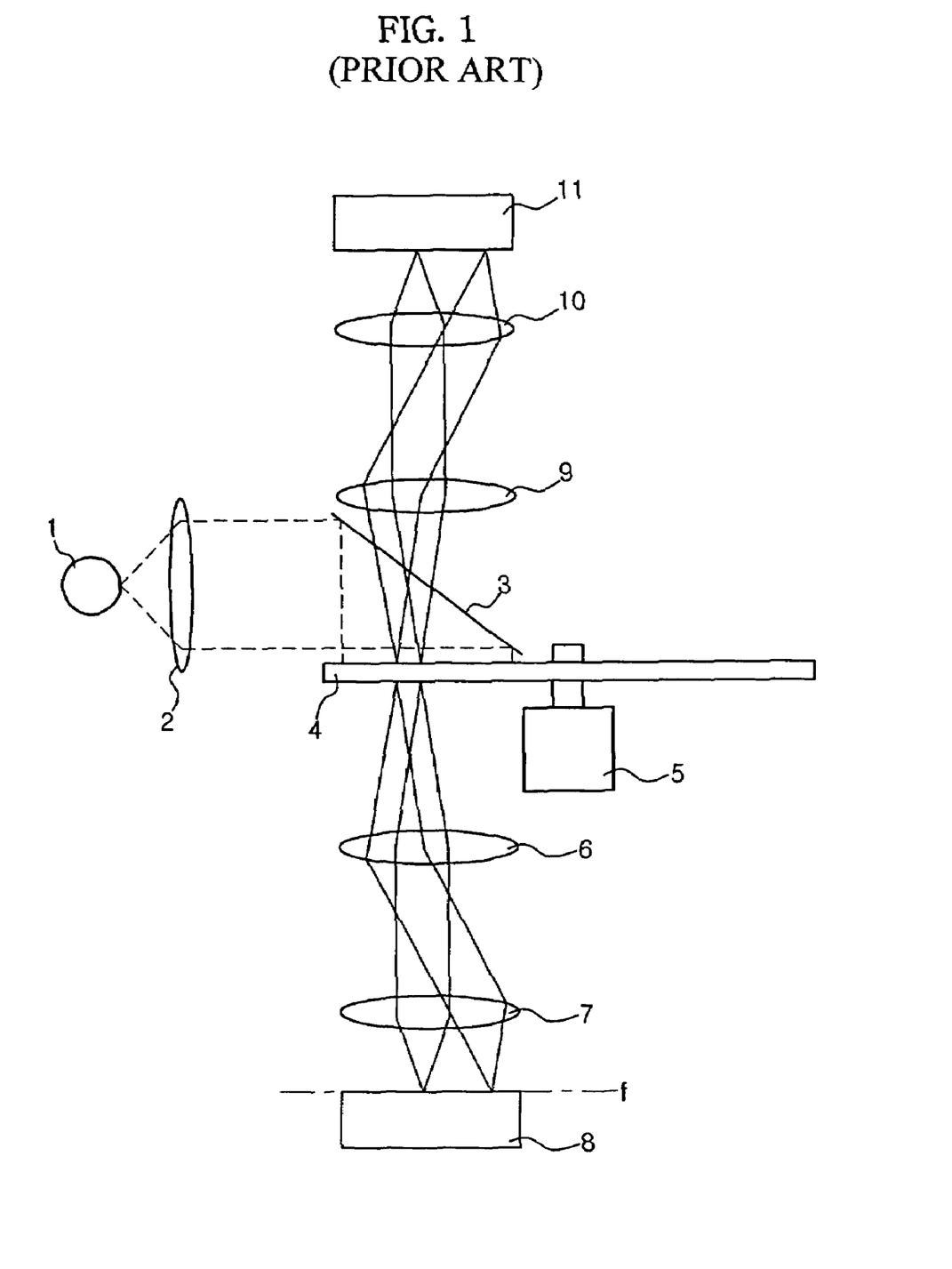
FIG. 1 is a schematic diagram illustrating a conventional confocal scanning microscope.

Referring to FIG. 1, the confocal scanning microscope using the Nipkow disk includes a light source 1, a collimating lens 2 for transforming light emitted from the light source 1 into a parallel beam, a beam splitter 3 for changing a direction of the parallel beam incident from the collimating lens 2, a Nipkow disk 4 having a plurality of apertures formed therein such that only a portion of a beam incident from the beam splitter 3 passes therethrough, a motor 5 for rotating the Nipkow disk, a tube lens 6 for transforming a beam, which has passed through the Nipkow disk 4, into a parallel beam, an objective lens 7 for irradiating a sample 8 with the parallel beam incident from the tube lens 6, a first lens 9 for transforming the beam reflected from the sample 8 and passed through the Nipkow disk 4 into a parallel beam, and a second lens 10 for concentrating the beam passed through the first lens 9 onto a two-dimensional photo-detector 11 for acquisition of an image.

Figure 2A:
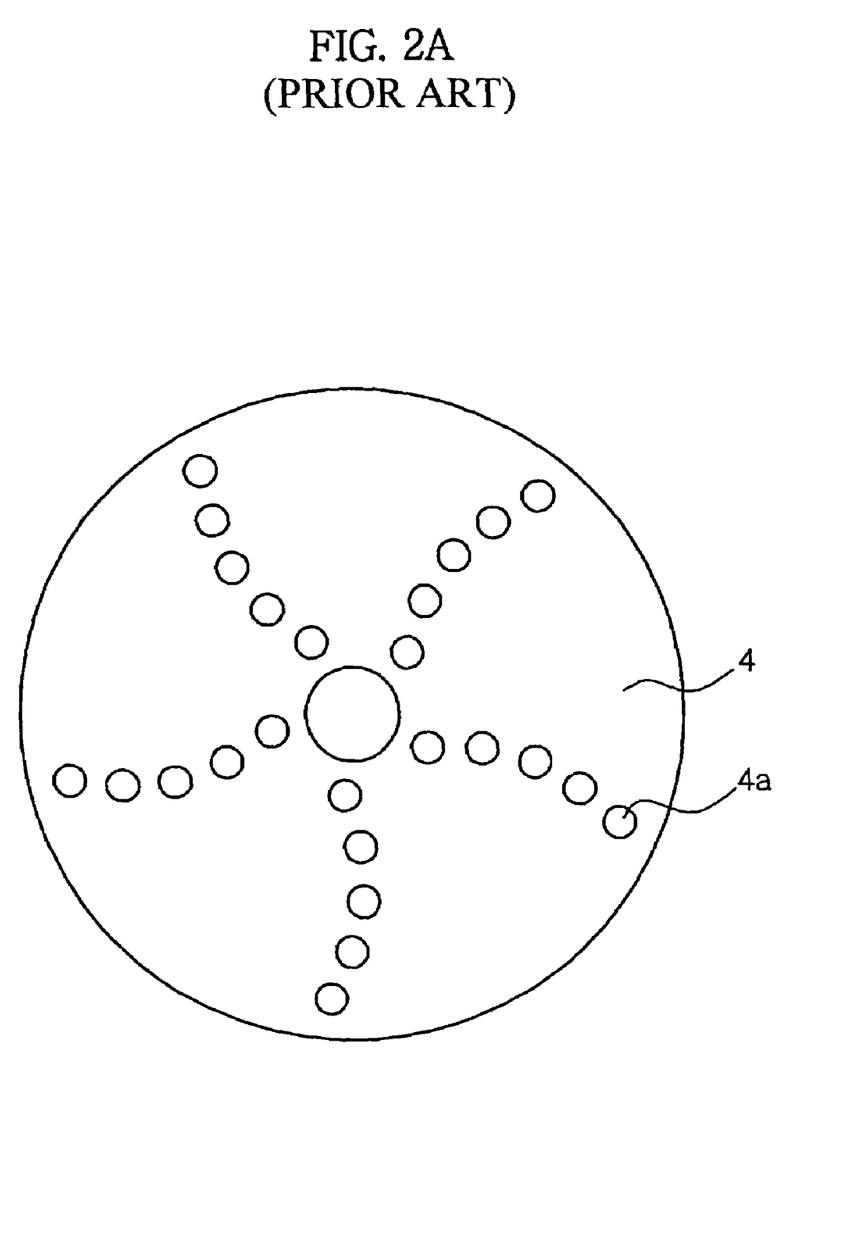
FIGS. 2A and 2B are plan views illustrating a shape of a Nipkow disk of the confocal scanning microscope shown in FIG. 1.

The light emitted from the source of light 1 becomes the parallel beam after passing through the collimating lens 2. This parallel beam illuminates a top surface of the Nipkow disk 4 after being reflected at the beam splitter 3. As shown in FIG. 2A, a plurality of apertures 4a each having a pin hole shape are distributed (formed) in the Nipkow disk 4. With this distribution of the apertures 4a, only a portion of the parallel beam irradiating the Nipkow disk 4 passes through the apertures 4a. A beam passed through the apertures 4a propagates at various angles by diffraction, thereby causing an effect as if a point of the light source is placed on each aperture 4a. The tube lens 6 and the objective lens 7 form an image on the sample 8 by irradiating the sample 8 with the beam passed through the apertures 4a. Only a plurality of point regions of an overall observation region on the sample 8, which correspond to the apertures 4a, are illuminated. In order to illuminate the overall observation region on the sample 8, positions of the apertures 4a must be varied. To this end, the motor 5 connected to a center of the Nipkow disk 4 rotates the Nipkow disk 4. When the positions of the apertures 4a are varied with respect to the sample 8 according to rotation of the Nipkow disk 4, the overall observation region on the sample 8 is illuminated.

The beam illuminating on the sample 8 is reflected from the sample 8 and passes through the objective lens 7 and the tube lens 6 for formation of an image on the Nipkow disk 4. At this time, some beam, reflected from a focal plane (f) of the objective lens 7, of the beam reflected from the sample 8, passes through the apertures 4a of the Nipkow disk 4, however, some portion of the beam, reflected from points deviated from the focal plane (f) in the optical axis direction, of the beam reflected from the sample 8, does not pass through the apertures 4a. This accounts for the so-called confocal principle through which high resolution in the optical axis direction can be obtained.

The beam passed through the apertures 4a is incident into the two-dimensional photo-detector 11 through the first lens 9 and the second lens 10 so that an image is formed on the photo-detector 11. As the positions of the apertures 4a are varied according to the rotation of the Nipkow disk 4 by the motor 5, a position on the photo-detector 11 at which the image is formed is varied. Accordingly, an optical signal is transported on the overall region of the two-dimensional photo-detector 11, so that a two-dimensional image can be at once obtained with respect to the sample 8.

Figure 2B:
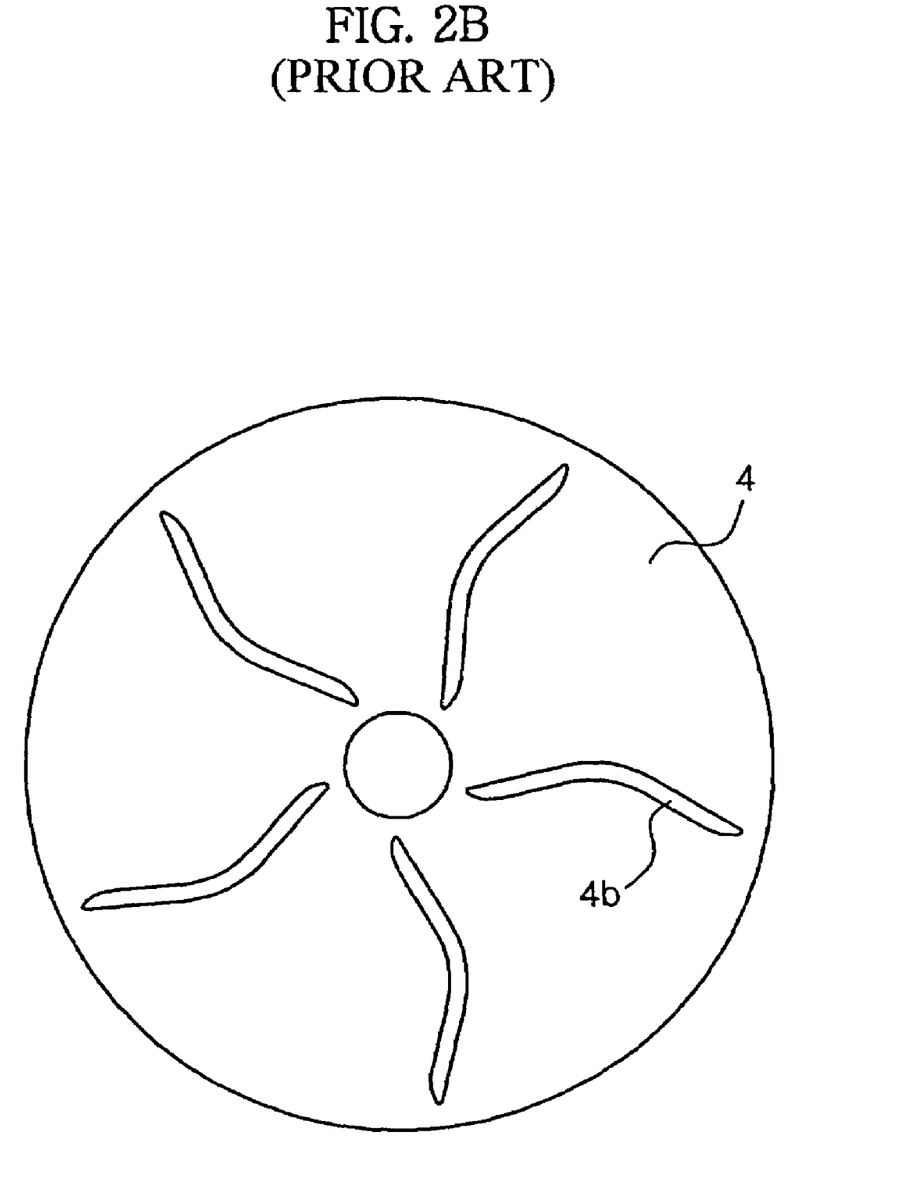

FIG. 2B illustrates a shape of the Nipkow disk 4, where slit-shaped curve apertures 4b are formed. In the case of the confocal scanning microscope using the Nipkow disk 4 having the slit-shaped curve apertures 4b formed thereon, an illumination beam passing through the Nipkow disk 4 takes a line shape, and a region to be illuminated on the sample 8 also takes a line shape. When the Nipkow disk 4 is rotated, the illumination beam of the line shape for forming an image on the sample 8 is moved, and accordingly, the image of the line shape formed on the photo-detector 11 is also moved to obtain a two-dimensional image of the sample 8.

However, although the confocal scanning microscope using the Nipkow disk 4 has an advantage of an image acquisition speed higher than that of the confocal scanning microscope using the optical deflector, it has a problem of deterioration of the resolution in the optical axis direction since it illuminates not a point but a plurality of point regions or a line region on the sample for parallel processing of signals.

Figure 3:
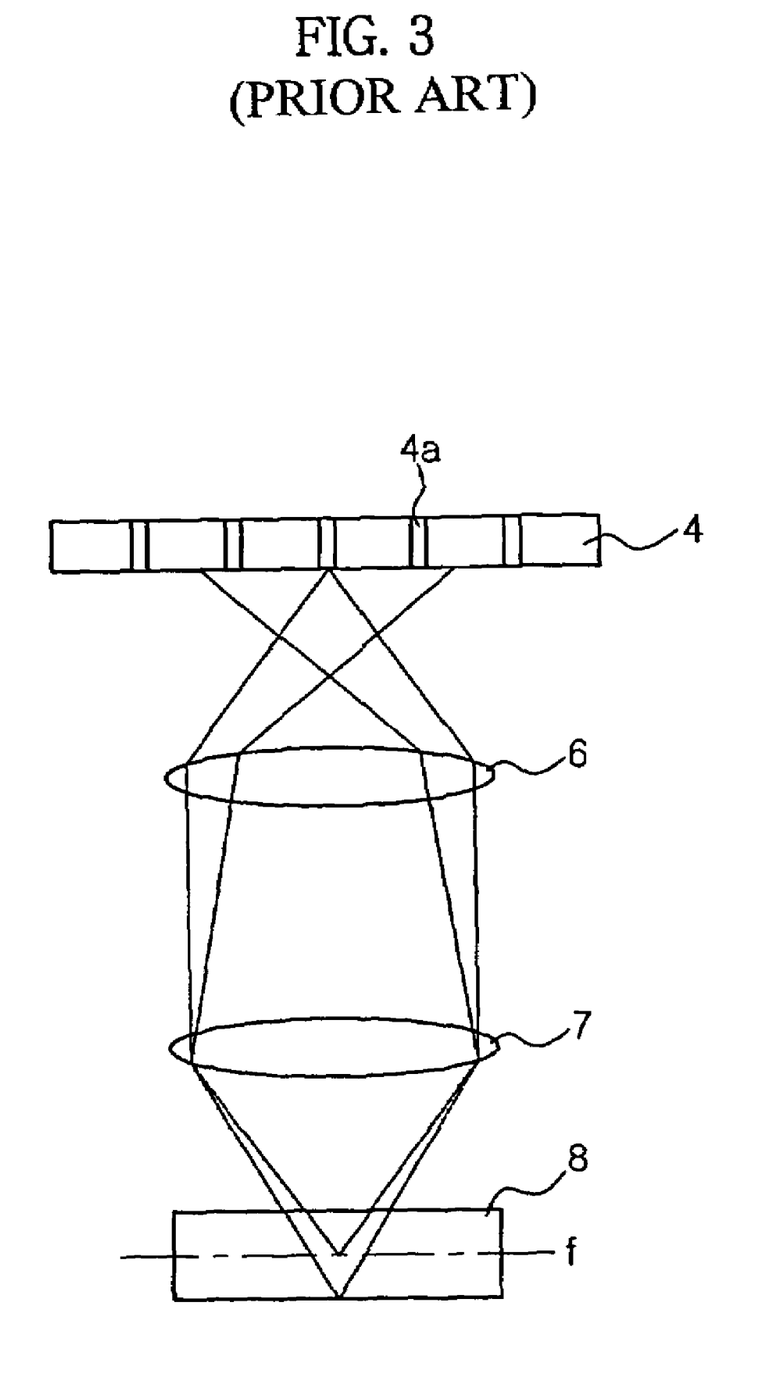
FIG. 3 is a schematic view illustrating a traveling path of light reflected from a sample in the confocal scanning microscope shown in FIG. 1.

As shown in FIG. 3, the beam reflected from the focal plane (f) of the objective lens 7 is exactly concentrated on and exits through the apertures 4a of the Nipkow disk 4 through which the illumination beam has been emitted, after passing through the objective lens 7 and the tube lens 6. However, the beam reflected from the points deviated from the focal plane (f) and moved deeper in the optical axis direction is not exactly concentrated on the apertures 4a, forms an image before the apertures 4a, and then, passes through adjacent apertures 4a as well as the apertures 4a through which the illumination beam is emitted. The beam illuminated on the adjacent apertures 41 acts as a kind of noise, which deteriorates optical performance in the optical axis direction.

Figure 4:
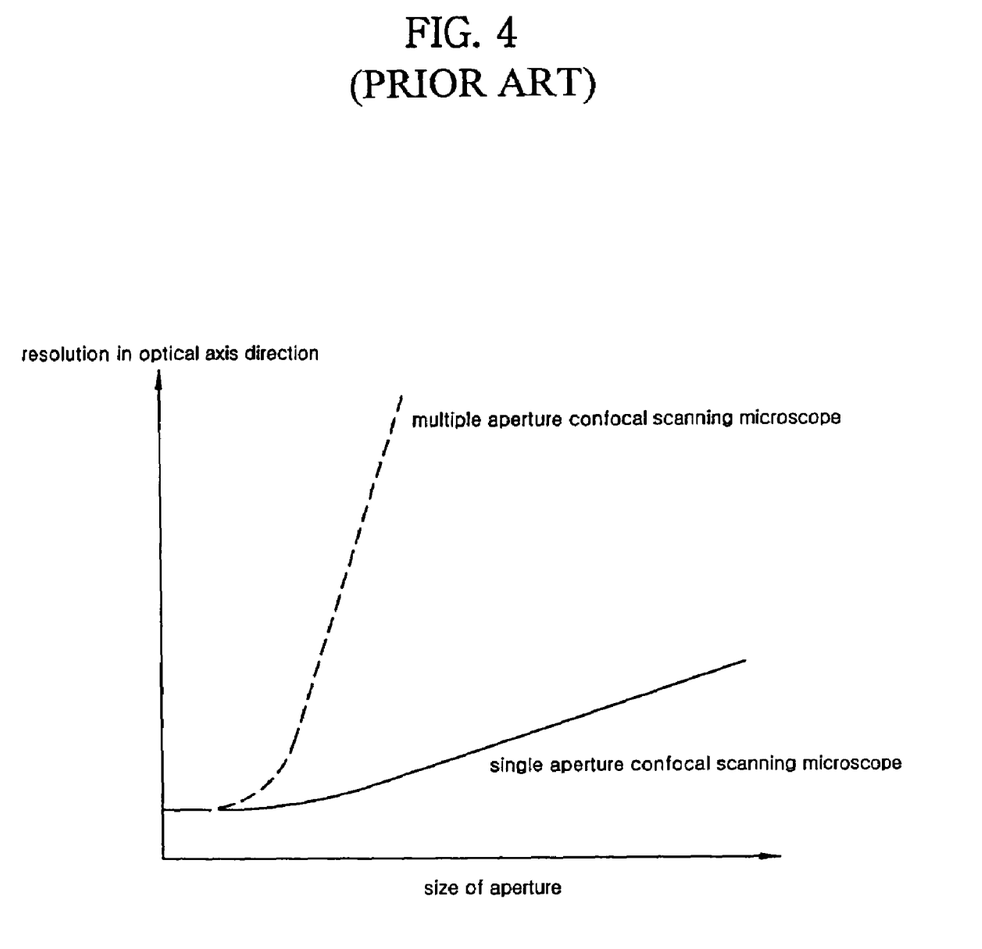
FIG. 4 is a graph showing a resolution in an optical axis direction when a size of a aperture in confocal scanning microscopes using a single aperture and multiple apertures is changed.

FIG. 4 is a graph showing a resolution in an optical axis direction when a size of the aperture in confocal scanning microscopes using a single aperture and multiple apertures is changed. In order to obtain the amount of beam of a range within which an image can be measured, it is required to increase the size of the aperture over a prescribed size. However, it can be seen from FIG. 4 that a resolution value in the confocal scanning microscope using the multiple apertures is abruptly increased as the size of the aperture is increased, which results in deterioration of performance of the confocal scanning microscope.

SUMMARY OF THE INVENTION

The present general inventive concept provides a confocal scanning microscope using a Nipkow disk, which is capable of preventing deterioration of performance in an optical axis direction while maintaining a high measurement speed.

Additional aspects and/or advantages of the invention will be set forth in part in the description which follows and, in part, will be obvious from the description, or may be learned by practice of the invention.

The foregoing and/or other aspects and advantages of the present general inventive concept may be achieved by providing a confocal scanning microscope using two Nipkow disks, the confocal scanning microscope comprising a light source, an illuminating device to pass the light from the light source toward a certain direction, two Nipkow disks each having slit-shaped apertures formed thereon such that the light incident from the illuminating device travels in a form of light which has passed through a single aperture, a first optical system to form an image on a sample by the light passed through the Nipkow disks, and a second optical system to form a second image by the light reflected from the sample and passed through the Nipkow disks.

The illuminating device may include a collimating lens to transform the light emitted from the light source into a parallel beam, and a beam splitter to change a direction of the parallel beam incident from the collimating lens 2.

The two Nipkow disks may be disposed adjacent to and overlap each other in the certain direction.

The confocal scanning microscope may further comprise a relay optical system disposed between the two Nipkow disks to guide the light passing between the two Nipkow disks.

The two Nipkow disks may be rotated at different rotational speeds.

The two Nipkow disks may be arranged in such a manner that rotation axes thereof are laid on a straight line.

The first optical system may include a tube lens to transform the light passed through the Nipkow disks into a parallel beam, and an objective lens to collect the parallel passed through the tube lens.

The second optical lens may include a first lens to transform the reflected light passed through the Nipkow disks into a parallel beam, and a second lens to collect the parallel beam passed through the first lens.

The confocal scanning microscope may further comprise a photo-detector to convert an image formed in the second optical system into an electrical signal.

The foregoing and/or other aspects and advantages of the present general inventive concept may also be achieved by providing a confocal scanning microscope including two Nipkow disks each having slit-shaped apertures formed thereon such that the light incident from the illuminating device travels in a form of light which has passed through a single aperture.

The foregoing and/or other aspects and advantages of the present general inventive concept may also be achieved by providing a confocal scanning microscope comprising two Nipkow disks each having slit-shaped apertures formed thereon, wherein a common aperture is formed by a combination of apertures formed in the two Nipkow disks and the two Nipkow disks are rotatably provided such that position of the common aperture can be varied with respect to center axes of the Nipkow disks.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, a description will be given of a confocal scanning microscope using Nipkow disks according to embodiments of the present general inventive concept with reference to the accompanying drawings.

Figure 5:
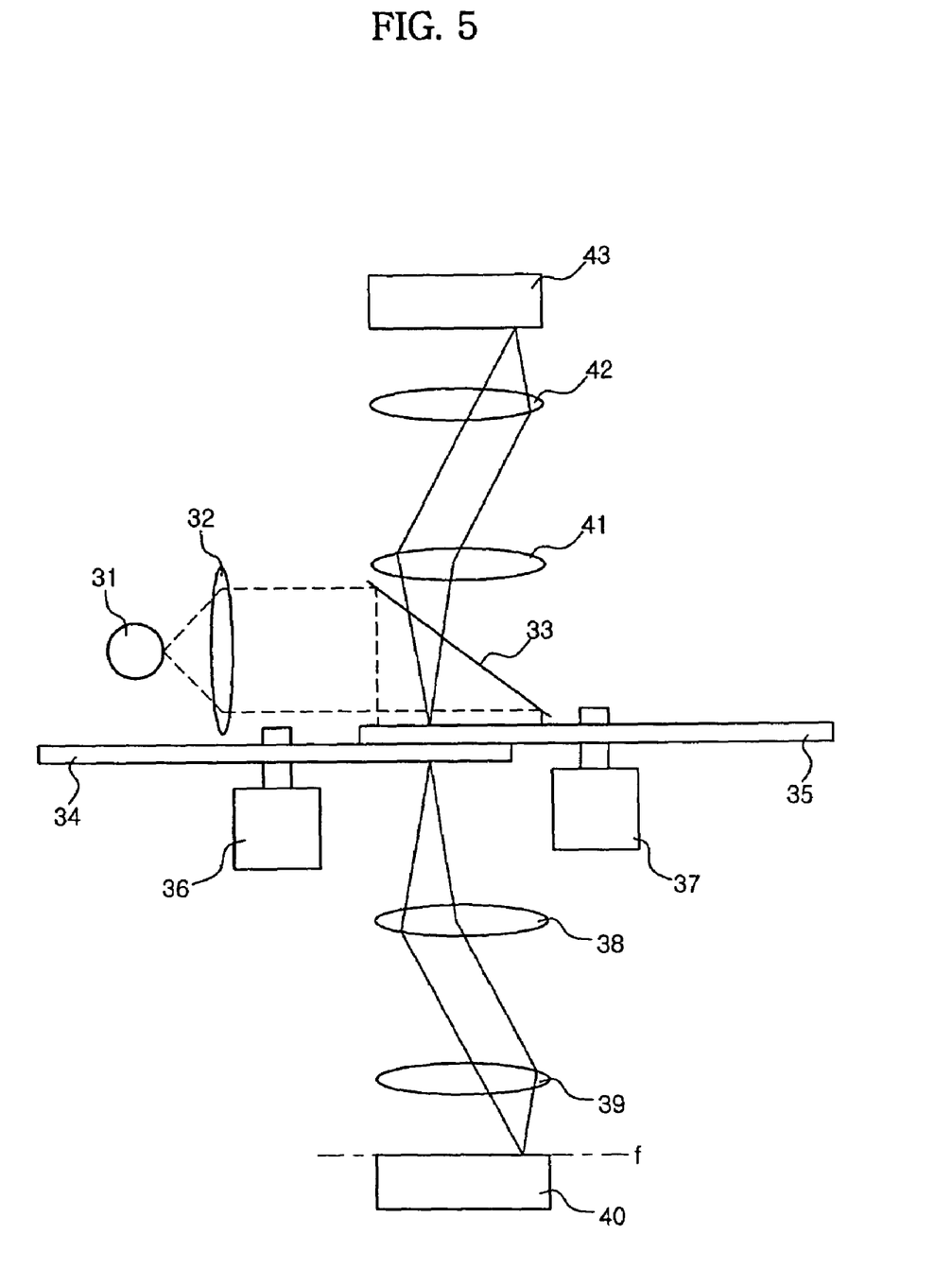
FIG. 5 is a schematic view illustrating a confocal scanning microscope according to an embodiment of the present general inventive concept.
Figure 6:
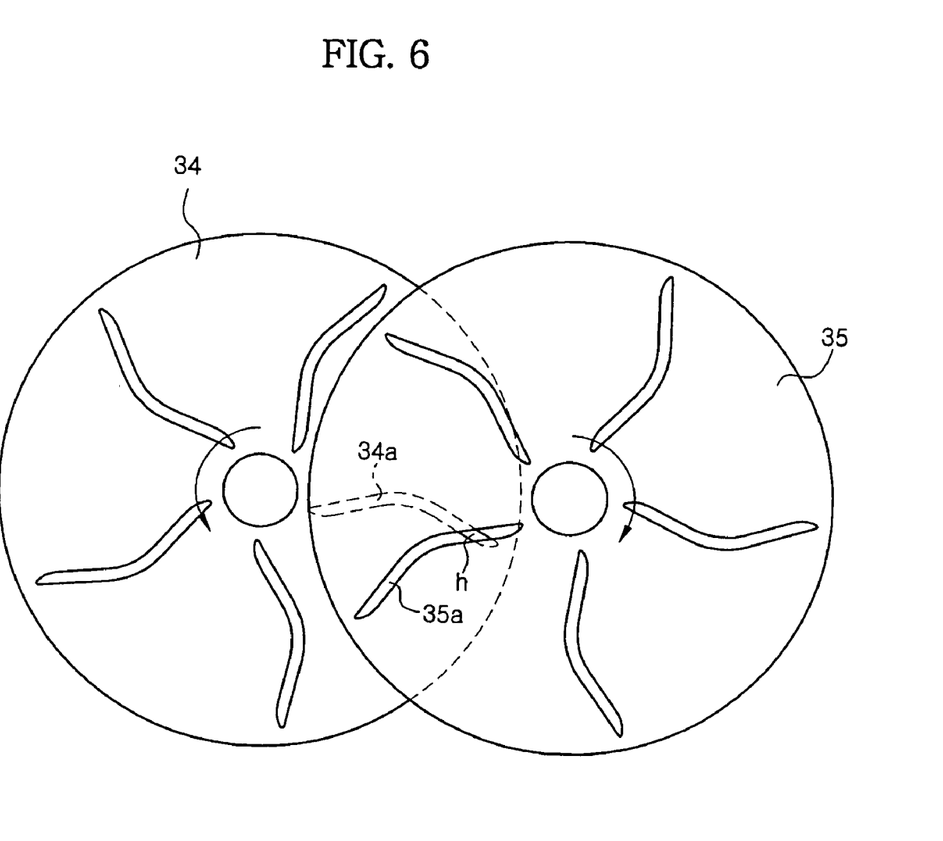
FIG. 6 is a plan view illustrating a Nipkow disk of the confocal scanning microscope of FIG. 5.

Referring to FIGS. 5 and 6, a confocal scanning microscope according to an embodiment of the present general inventive concept comprises a light source 31, a collimating lens 32 to transform light emitted from the source of light 31 into a parallel beam, a beam splitter 33 to change a direction of the parallel beam incident from the collimating lens 32, a first Nipkow disk 34 and a second Nipkow disk 35 having respective slit-shaped apertures 34a and 35a formed thereon, through which a portion of the light incident from the beam splitter 33 passes, a first motor 36 and a second motor 37 to rotate the first Nipkow disk 34 and the second Nipkow disk 35, respectively, a tube lens 38 to transform the light passed through an intersecting point h of the two apertures 34a and 34a into a parallel beam, a first lens 41 to transform the light passed through the first and second Nipkow disks 34 and 35 into a parallel beam, and a second lens 42 to concentrate the light passed through the first lens 41 into a two-dimensional photo-detector 43 for acquisition of an image.

The confocal scanning microscope according to this embodiment of the present general inventive concept uses the two Nipkow disks 34 and 35, as described above, unlike a conventional confocal scanning microscope. Hereinafter, an operation of the confocal scanning microscope FIG. 5 will be described.

The light emitted from the light source of light 31 is transformed into the parallel beam by the collimating lens 32. The parallel beam is reflected by a beam splitter 33 and illuminates the first and second Nipkow disks 34 and 35. As shown in FIG. 6, the slit-shaped apertures 34a and 35a are formed on the first and second Nipkow disk 34 and 35, respectively, and the light passes through only a small hole, i.e., the intersection hole h, formed at an intersecting point of the apertures 34a and 35a of the first and second Nipkow disks 34 and 35. This hole h acts as a single aperture. The light passed through the first and second Nipkow disks 34 and 35 travels in diverse directions by diffraction phenomenon, thereby causing an effect as if a point source of the light is placed in the hole through which the light passes. The light passed through the first and second Nipkow disks 34 and 35 illuminates the sample 40 through the tube lens 38 and the objective lens 39. The light reflected from the sample 40 is concentrated in the hole h, through which the light has passed, through the objective lens 39 and the tube lens 38. At this time, only the light reflected from a focal plane (f) of the objective lens 39 passes through the hole h, however, the light reflected from a point deviated from the focal plane (f) in an optical axis direction does not pass through the hole h by being interrupted by the first and second Nipkow disks 34 and 35. Accordingly, a confocal effect with high resolution in the optical axis direction can be obtained.

As shown in FIG. 6, since the hole h formed at the intersecting point of the apertures 34a and 35a of the first and second Nipkow disks 34 and 35 exists uniquely, not in multiple, resolution deterioration in the optical axis direction due to multiple apertures can be prevented.

The light passed through the first and second Nipkow disks 34 and 35 forms an image on the two-dimensional photo-detector 43 through the first lens 41 and the second lens 42. The two-dimensional photo-detector 43 has an imaging device such as a charge coupled device (CCD) to convert the light into an electrical signal.

In order to obtain a two-dimensional image with respect to an overall observation region on the sample 40, when the first motor 36 and the second motor 37 are rotated at different speeds, a position of the hole h formed at the intersecting point of the apertures 34a and 35a of the first and second Nipkow disks 34 and 35 is moved with respect to the sample 40 or centers of the first and second Nipkow disks 34 and 35, so that the two-dimensional image of the sample 40 can be obtained.

Figure 7:
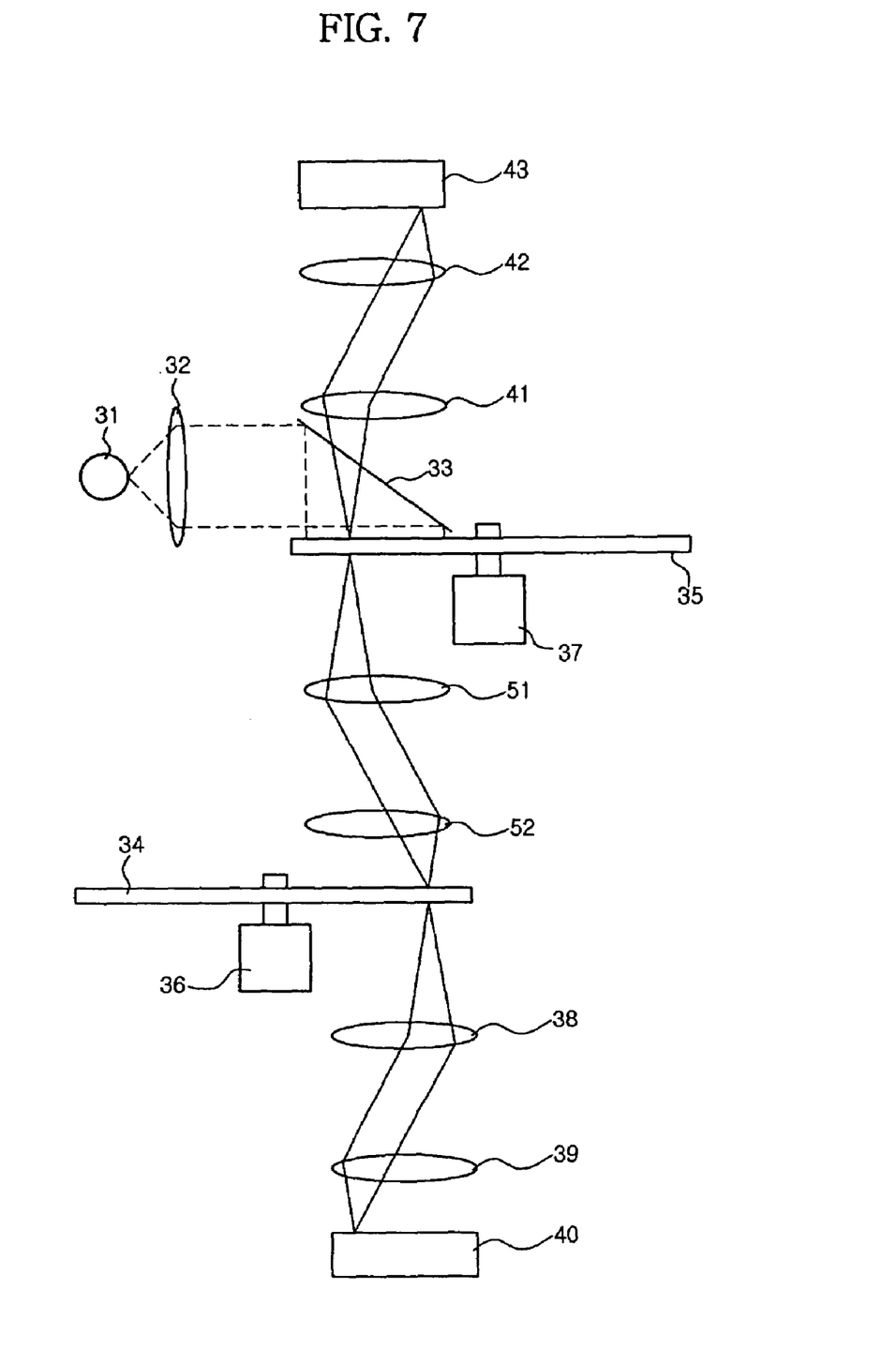
FIG. 7 is a schematic view illustrating a confocal scanning microscope according to another embodiment of the present general inventive concept.

FIG. 7 is a schematic view illustrating a confocal scanning microscope according to another embodiment of the present general inventive concept, where the same reference numerals refer to the same elements as the confocal scanning microscope of FIG. 5, explanation of which will be omitted for the purpose of brevity.

In the confocal scanning microscope of FIG. 5, in order that the hole h formed at the intersecting point of the apertures 34a and 35a of the two Nipkow disks 34 and 35 acts as a single aperture, a gap between the two Nipkow disks 34 and 35 must be very small and a thickness of the Nipkow disks 34 and 35 must be very thin.

The confocal scanning microscope of FIG. 7 may solve such a shortcoming of the embodiment of FIG. 5, by providing a first relay lens 51 and a second relay lens 52 between the first and second Nipkow disks 34 and 35 to transport the light passed through the first Nipkow disk 34 to the second Nipkow disk 35, The first and second Nipkow disks 34 and 35 are spaced apart from each other by a certain distance. The first relay lens 51 transforms the light passed through the second Nipkow disk 35 into the parallel beam and the second relay lens 52 concentrates the parallel beam passed through the first relay lens 51 on the first Nipkow disk 34. Thus, by using the first and second relay lenses 51 and 52, the light can be passed only at the intersection point of the apertures 34a and 35a of the first and second Nipkow disks 34 and 35.

Figure 8:
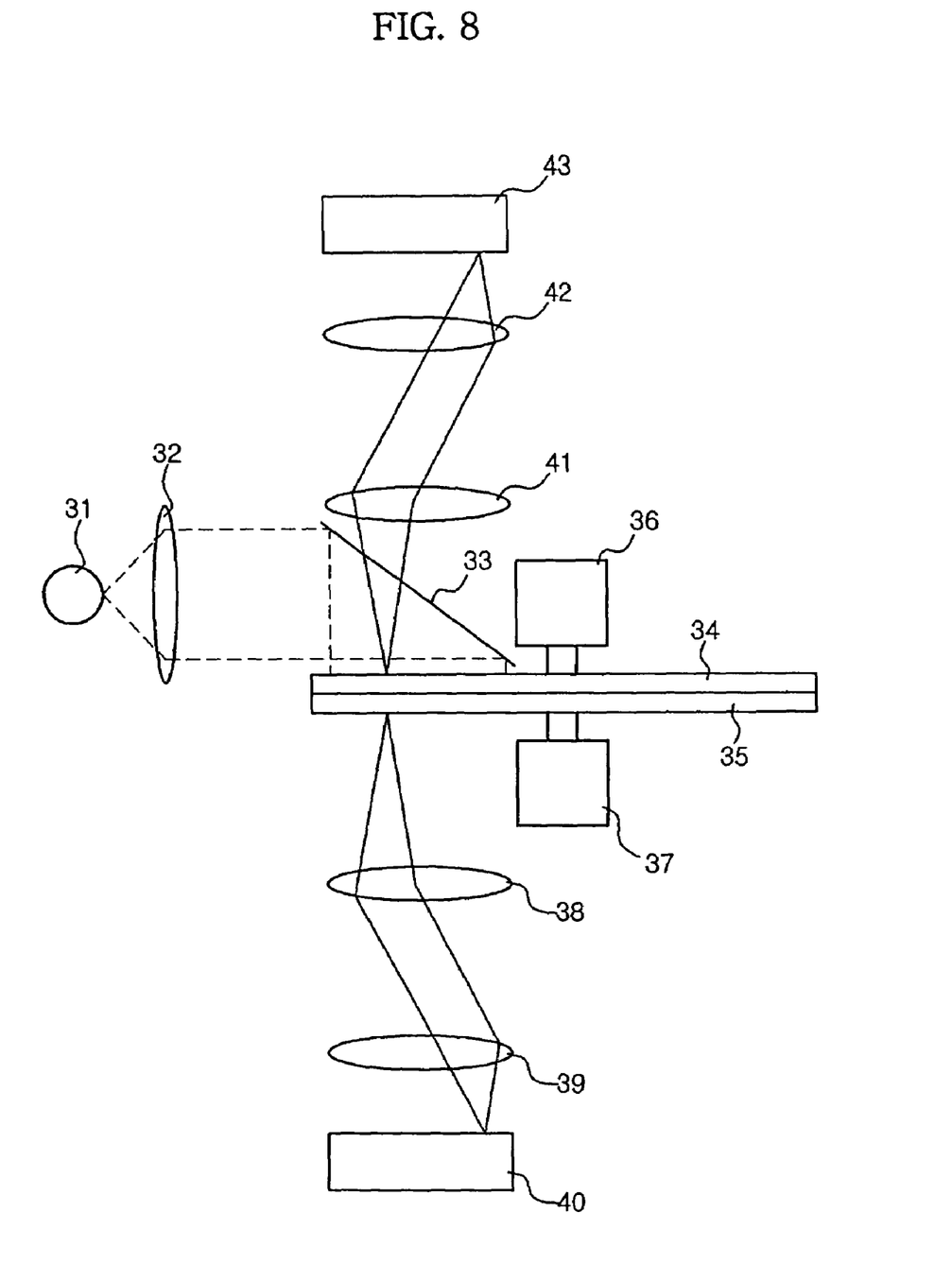
FIG. 8 is a schematic view illustrating a confocal scanning microscope according to another embodiment of the present general inventive concept.
Figure 9:
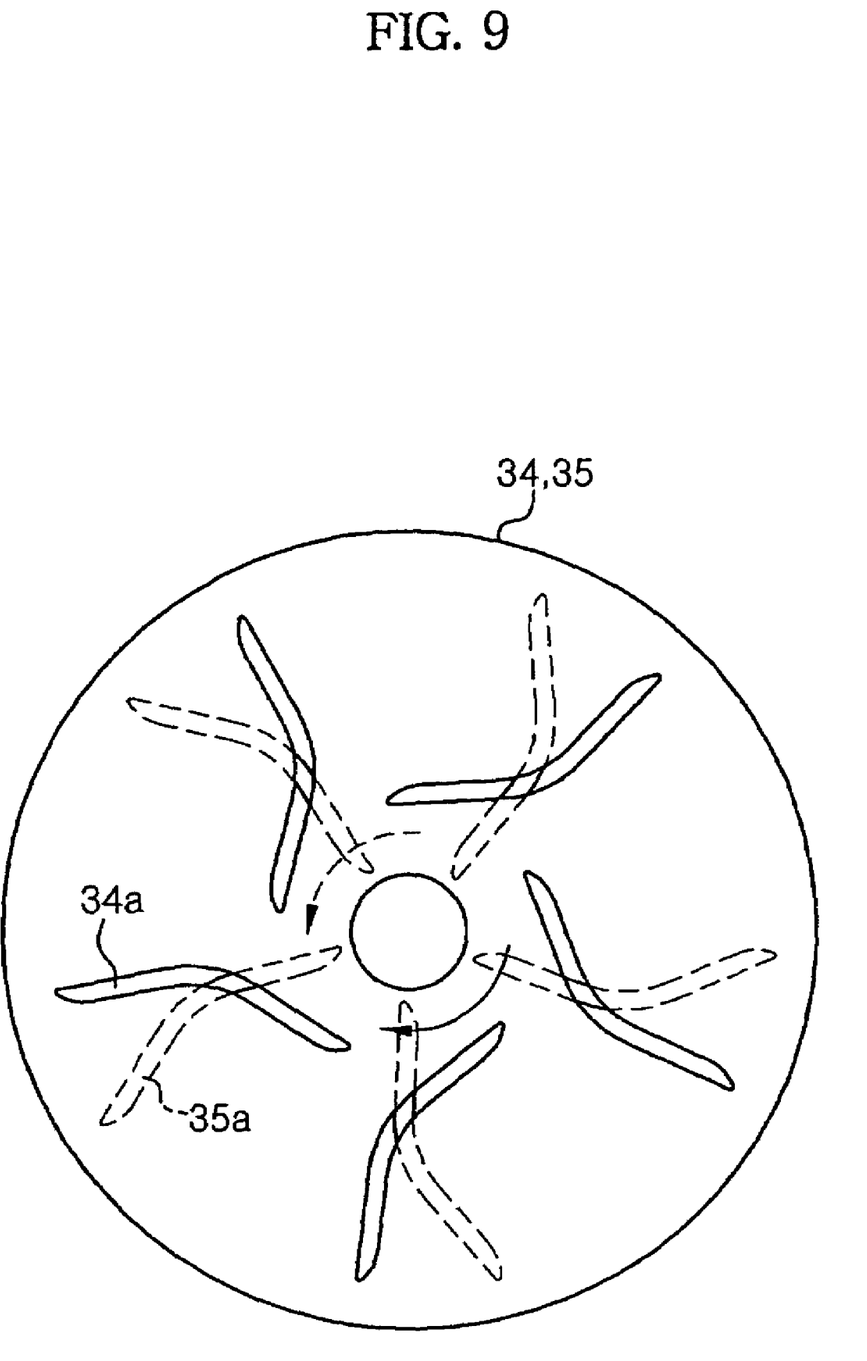
FIG. 9 is a plan view illustrating a Nipkow disk of the confocal scanning microscope of FIG. 8.

FIG. 8 is a schematic view illustrating a confocal scanning microscope according to another embodiment of the present general inventive concept and FIG. 9 is a plan view illustrating a Nipkow disk of the confocal scanning microscope of FIG. 8, where the same reference numerals refer to the same elements as the confocal scanning microscopes according to the embodiments of the FIGS. 5 and 7, explanation of which will be omitted for the purpose of brevity.

The confocal scanning microscope according to this embodiment of the present general inventive concept modifies arrangement of the two Nipkow disks 34 and 35 and the corresponding driving motors 36 and 37, compared to the confocal scanning microscope of FIG. 7. Rotation axes of the two Nipkow disks 34 and 35 are disposed on a straight line. The confocal scanning microscope according to this has a merit in that a size thereof can be reduced compared to that of the confocal scanning microscope of FIG. 7.

Figure 10:
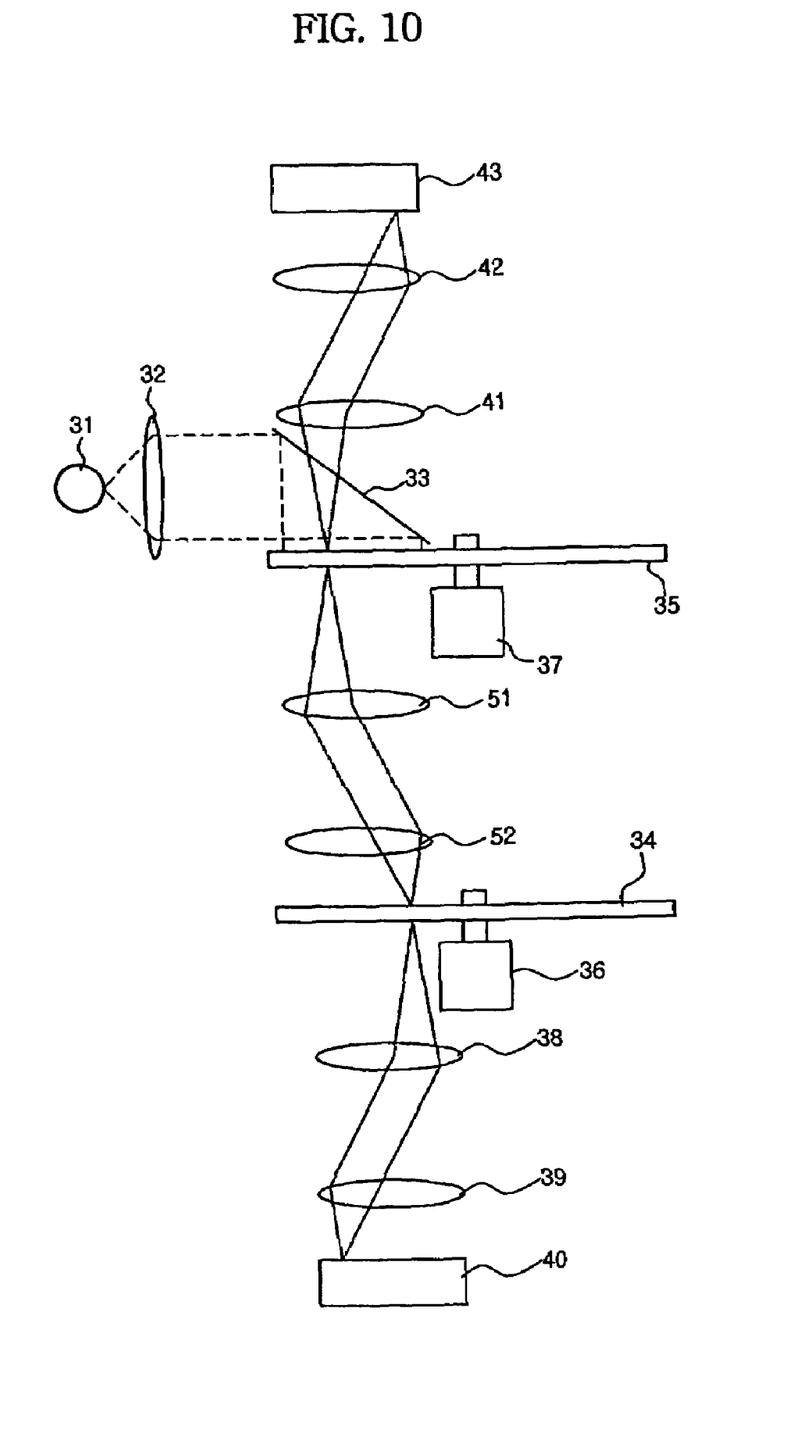
FIG. 10 is a schematic view illustrating a confocal scanning microscope according to another embodiment of the present general inventive concept.

FIG. 10 is a schematic view illustrating a confocal scanning microscope according to another embodiment of the present general inventive concept, where the same reference numerals refer to the same elements as the confocal scanning microscopes of FIGS. 5, 7, and 8, explanation of which will be omitted for the purpose of brevity.

In the confocal scanning microscope according to this embodiment of the present general inventive concept, the first and second relay lenses 51 and 52 are provided between the two Nipkow disks 34 and 35 of the confocal scanning microscope of FIG. 8, in a manner similar to the confocal scanning microscope of FIG. 7.

As is apparent from the above description, with the confocal scanning microscope according to the present general inventive concept, illumination light can be passed through only an intersecting portion of the apertures of the two Nipkow disks and the interesting portion of the apertures are moved when the Nipkow disks are rotated, thereby obtaining an effect as if a single aperture is moved at a high speed. Accordingly, the performance deterioration in the optical axis direction occurring when disks having multiple apertures are used can be prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A confocal scanning microscope comprising two Nipkow disks to each relatively rotate on separate axes and each having apertures formed thereon, wherein a common aperture is formed by a combination of apertures formed in the two Nipkow disks, and the two Nipkow disks are rotatably provided such that a position of the common aperture can be varied with respect to a center of the two Nipkow disks,
    wherein a confocal scanning microscope further comprising:
    a relay optical system disposed between the two Nipkow disks to guide light to pass between the two Nipkow disks.

2. The confocal scanning microscope as set forth in claim 1, wherein the relay optical system includes:
    a first relay lens transforming the light passed through one of the Nipkow disks into the parallel beam; and
    a second relay lens concentrating the parallel beam passed through the first relay lens on the other Nipkow disk.

3. The confocal scanning microscope as set forth in claim 1, further comprising:
    a light source;
    a photo detector; and
    first and second optical systems disposed opposite to each other with respect to the two Nipkow disks to transform light emitted from the light source toward a sample through the two Nipkow disks and transform the light reflected from the example toward the photo detector through the two Nipkow disks.

4. The confocal scanning microscope as set forth in claim 1, further comprising:
    a light source to emit light;
    a photo detector;
    a optic unit to transform the light toward a sample through the combination of the two Nipkow disks;
    a first optical system to transform the light passed through the combination of the two Nipkow disks toward the example, and to transform the light reflected from a focal plane of the example toward a second combination of the apertures of the two Nipkow disks; and
    a second optical system to transform the light passed through the second combination of the Nipkow disks toward the detector.

5. The confocal scanning microscope as set forth in claim 1, further comprising:
    a detector to detect light corresponding to an image of a sample through the common aperture of the apertures of the two Nipkow disks.

6. The confocal scanning microscope as set forth in claim 1, wherein the two Nipkow disks are parallel to each other.

7. The confocal scanning microscope as set forth in claim 1, wherein the apertures comprises slit-shaped apertures formed in a combination of a radial direction and a circumference direction of the two Nipkow disks.

8. The confocal scanning microscope as set forth in claim 1, wherein the two Nipkow disks comprise a first and a second disks, the first disk comprises first apertures formed in a first direction with respect to a center thereof, and the second disk comprises second apertures formed in a second direction with respect to a center thereof.

9. The confocal scanning microscope as set forth include 8, wherein one of the first apertures and one of the second apertures forms the common apertures.

10. The confocal scanning microscope as set forth in claim 8, wherein the first direction is a combination of a radial direction and a first circumference direction, and the second direction is a second combination of the radial direction and a second circumference direction.

11. The confocal scanning microscope as set forth in claim 1, wherein the apertures comprises a first aperture formed in one of the two Nipkow disks; and a second aperture formed on the other one of the two Nipkow disks, and portions of the first and second apertures corresponding to the common aperture are not disposed on a first and a second lines parallel to a center axis of the two Nipkow disks, respectively.

12. A confocal scanning microscope comprising:
    a light source;
    an illuminating device to pass light from the light source toward a certain direction;
    two Nipkow disks to each relatively rotate on separate axes and each having slit-shaped apertures formed thereon such that the light incident from the illuminating device travels in a form of light which has passed through the slit-shaped apertures as a single aperture which varies with respect to a center of the two Nipkow disks according to the relative rotation of the two Nipkow disks;
    a first optical system to form an image on a sample using the light passed through the Nipkow disks;
    a second optical system to form a second image corresponding to the image using the light reflected from the sample and passed through the Nipkow disk; and
    a relay optical system disposed between the two Nipkow disks to guide light to pass between the two Nipkow disks.

13. The confocal scanning microscope as set forth in claim 12, wherein the illuminating device comprises:
    a collimating lens to transform the light emitted from the light source into a parallel beam; and
    a beam splitter to change a direction of the parallel beam incident from the collimating lens.

14. The confocal scanning microscope as set forth in claim 12, wherein the relay optical system includes: a first relay lens transforming the light passed through one of the Nipkow disks into the parallel beam; and
    a second relay lens concentrating the parallel beam passed through the first relay lens on the other Nipkow disk.

15. The confocal scanning microscope as set forth in claim 12, wherein the two Nipkow disks rotates at different rotation speeds.

16. The confocal scanning microscope as set forth in claim 12, wherein the two Nipkow disks are arranged in such a manner that rotation axes thereof are disposed on a straight line.

17. The confocal scanning microscope as set forth in claim 12, wherein the first optical system comprises a tube lens to transform the light passed through the Nipkow disks into a parallel beam, and an objective lens to collect the parallel passed through the tube lens.

18. The confocal scanning microscope as set forth in claim 12, wherein the second optical lens comprises a first lens to transform reflected light passed through the Nipkow disks into a parallel beam, and a second lens to collect the parallel beam passed through the first lens.

19. The confocal scanning microscope as set forth in claim 12, further comprising;
    a photo-detector to convert the second image formed in the second optical system into an electrical signal.

* * * * *